US012739702B2

(12) United States Patent
Saha et al.

(10) Patent No.: US 12,739,702 B2
(45) Date of Patent: Sep. 15, 2026

(54) WIRELESS NETWORK DEVICE AND COMPUTATIONAL TASK REASSIGNMENT FOR POWER EFFICIENCY

(71) Applicant: Intel Corporation, Santa Clara, CA (US)

(72) Inventors: Sourav Saha, Bangalore (IN); Ingolf Karls, Feldkirchen (DE); Harish Mitty, Bangalore (IN); Jayprakash Thakur, Bangalore (IN); Mythili Hegde, Bangalore (IN); Vijaya Prasad Ummella, Bangalore (IN); Arun Jagadish, Bangalore (IN); Manjunath Kamath, Munich (DE); Praveen Kashyap Ananta Bhat, Bangalore (IN); Padmesh Murugan Latha, Bangalore (IN); Satyajit Siddharay Kamat, Bangalore (IN); Manisha Raiguru, Bangalore (IN); Isha Garg, Bangalore (IN); Abhijith Prabha, Kerala (IN); Jay Vishnu Gupta, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 18/474,263

(22) Filed: Sep. 26, 2023

(65) Prior Publication Data

US 2024/0146389 A1 May 2, 2024

(30) Foreign Application Priority Data

Nov. 2, 2022 (EP) .................................... 22205018

(51) Int. Cl.
*H04W 28/08* (2023.01)
*H04W 24/02* (2009.01)
(Continued)

(52) U.S. Cl.
CPC ....... *H04W 28/0958* (2020.05); *H04W 24/02* (2013.01); *H04B 7/155* (2013.01);
(Continued)

(58) Field of Classification Search
CPC .. H04B 7/155; H04B 7/2606; H04B 7/15507; H04W 40/125; H04W 40/22; H04W 88/04; H04W 28/0958; H04W 24/02
See application file for complete search history.

(56) References Cited

U.S. PATENT DOCUMENTS

2004/0229563 A1 11/2004 Fitton et al.
2010/0167743 A1 7/2010 Palanki et al.
(Continued)

FOREIGN PATENT DOCUMENTS

WO WO-2018205301 A1 * 11/2018 .............. H04W 4/02

OTHER PUBLICATIONS

Gebremichael et al., "Multi-Hop Relay Selection Based on Fade Durations", Jan. 2, 2020, Electronics (Year: 2020).*
(Continued)

*Primary Examiner* — Michael K Phillips
(74) *Attorney, Agent, or Firm* — Viering, Jentschura & Partner mbB

(57) ABSTRACT

A computing device, includes one or more processors, configured to receive first data corresponding to a first radiofrequency signal received from a first wireless communication device, and second data corresponding to a second radiofrequency signal received from a second wireless communication device; select either the first wireless communication device or the second wireless communication device as a repeater device based on the first data or the second data according to one or more repeater selection criteria; instruct a transceiver to send a third radiofrequency signal to the repeater device, wherein the third radiofre-
(Continued)

quency signal comprises third data and an instruction for the repeater device to repeat the third data to the third wireless communication device.

19 Claims, 9 Drawing Sheets

(51) Int. Cl.
*H04B 7/155* (2006.01)
*H04W 40/12* (2009.01)
*H04W 40/22* (2009.01)
*H04W 88/04* (2009.01)

(52) U.S. Cl.
CPC .......... *H04W 40/125* (2013.01); *H04W 40/22* (2013.01); *H04W 88/04* (2013.01)

(56) References Cited

U.S. PATENT DOCUMENTS

| | | | | |
|---|---|---|---|---|
| 2015/0327265 | A1* | 11/2015 | Lee | H04W 72/0446<br>370/315 |
| 2017/0164264 | A1* | 6/2017 | Kato | H04W 40/14 |
| 2017/0251507 | A1* | 8/2017 | Fodor | H04W 40/22 |
| 2019/0037022 | A1* | 1/2019 | Gupta | H04W 4/70 |
| 2022/0124543 | A1* | 4/2022 | Orhan | H04W 28/021 |
| 2023/0328491 | A1* | 10/2023 | Swar | H04W 4/46<br>455/500 |
| 2023/0413171 | A1* | 12/2023 | Perras | H04W 92/18 |
| 2025/0150933 | A1* | 5/2025 | Paladugu | H04W 40/22 |

OTHER PUBLICATIONS

Jin et al., "Mobile Computing Offload Cooperative Control System and Method", Nov. 15, 2018, WO, WO 2018205301 (Year: 2018).*

European Search Report issued for the corresponding EP patent application No. EP 22 205 018.9, dated Mar. 31, 2023, 9 pages (For informational purposes only).

* cited by examiner

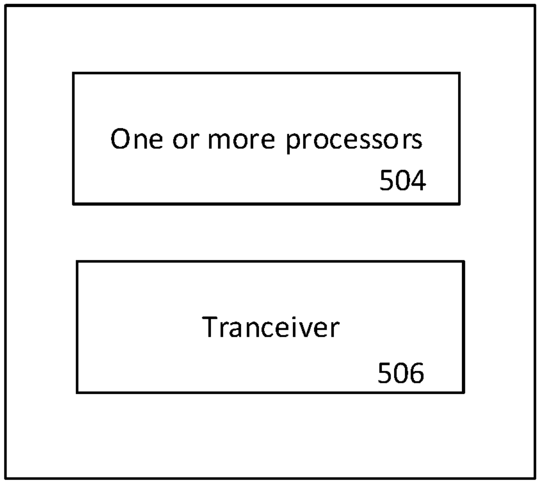

FIG. 5

Receive first data corresponding to a first radiofrequency signal received from a first wireless communication device, and second data corresponding to a second radiofrequency signal received from a second wireless communication device 602

↓ select either the first wireless communication device or the second wireless communication device as a repeater device based on the first data or the second data according to one or more repeater selection criteria 604

↓ control a transceiver to send a third radiofrequency signal to the repeater device, wherein the third radiofrequency signal comprises third data and an instruction for the repeater device to repeat the third data to the third wireless communication device. 606

FIG. 6

One or more processors 1002

Tranceiver 1004

FIG. 10

One or more processors 1102

Tranceiver 1104

FIG. 11 receive a workload report and a power report from each of a plurality of secondary computing devices, wherein each workload report comprises identifiers of applications running on a respective secondary computing device of the plurality of respective computing devices 1202 generate an optimized workload for the plurality of secondary computing devices based on the workload reports and the power reports 1204 control a transceiver to send a radiofrequency signal comprising the optimized workload 1206

FIG. 12

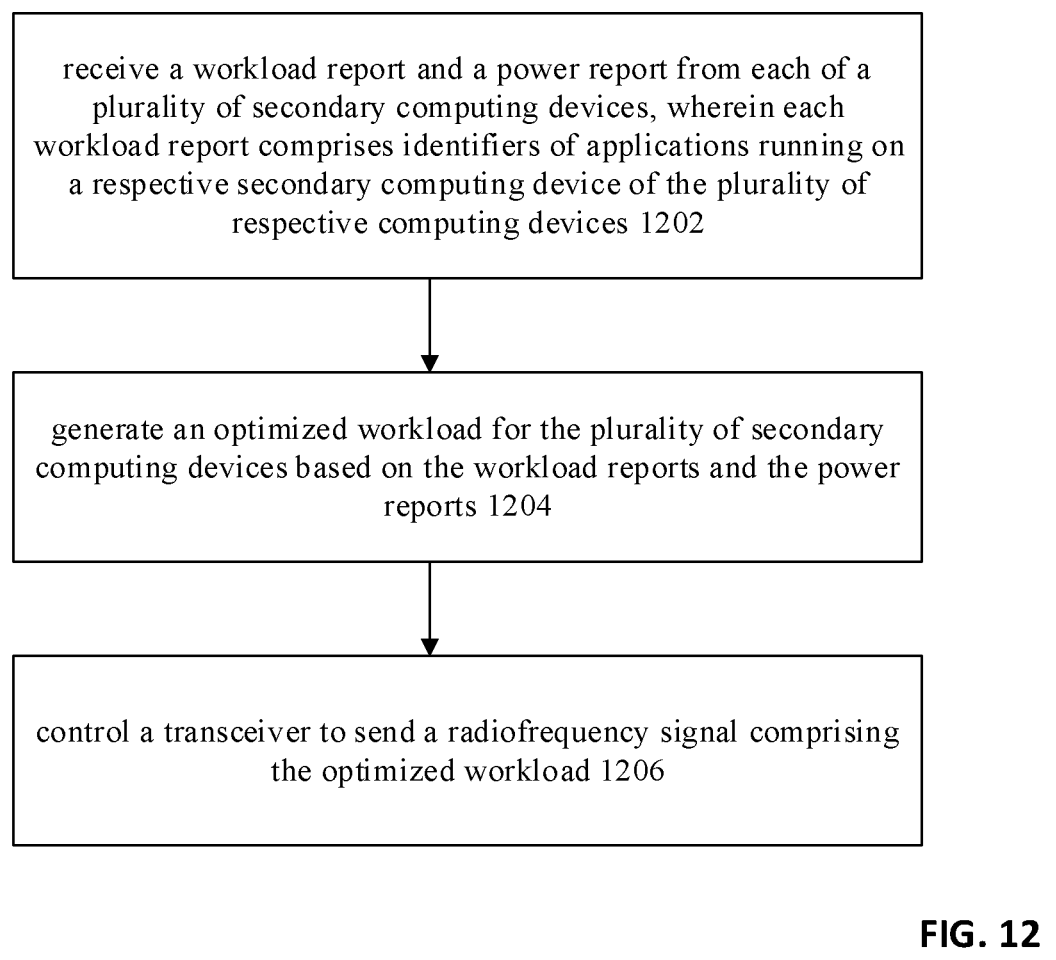

WIRELESS NETWORK DEVICE AND COMPUTATIONAL TASK REASSIGNMENT FOR POWER EFFICIENCY

CROSS-REFERENCE TO RELATED APPLICATIONS

This application claims priority to European Patent Application 22 205 018.9, filed at the European Patent Office on Nov. 2, 2022, the entire contents of which are incorporated herein by reference.

TECHNICAL FIELD

Various aspects of this disclosure generally relate to wireless communication protocols for selection of a repeater device for a mesh network and the optimized assignment of computational tasks among wireless networked devices.

BACKGROUND

With respect to a first aspect of the disclosure, many wireless networks are generated around a single access point (e.g. a Wi-Fi access point) that remains at a fixed location. In such configurations, channel congestion may limit the utility of the wireless network. Such limitations may be location specific, such as when one area of the wireless network is subject to greater interference or greater channel congestion than another area of the wireless network. Furthermore, the utility of the wireless network may be limited by distance between a user device and the wireless access point. Further still, solid objects or obstacles between the user device and the wireless access point may weaken the wireless signal, thereby limiting or entirely precluding communication between a user device and the wireless access point.

With respect to a second aspect of the disclosure, devices may be linked in a hub and spoke formation, in which a central device (e.g. often a device with a stable power source) serves as the hub. Despite these link configurations, there is no method to enact a global power-efficiency scheme for the connected devices.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which:

FIG. 5 depicts a computing device;

FIG. 6 depicts a method according to an aspect of the disclosure;

FIG. 10 depicts a primary computing device;

FIG. 11 depicts a secondary computing device; and

FIG. 12 depicts a method.

DESCRIPTION

Figure 1:
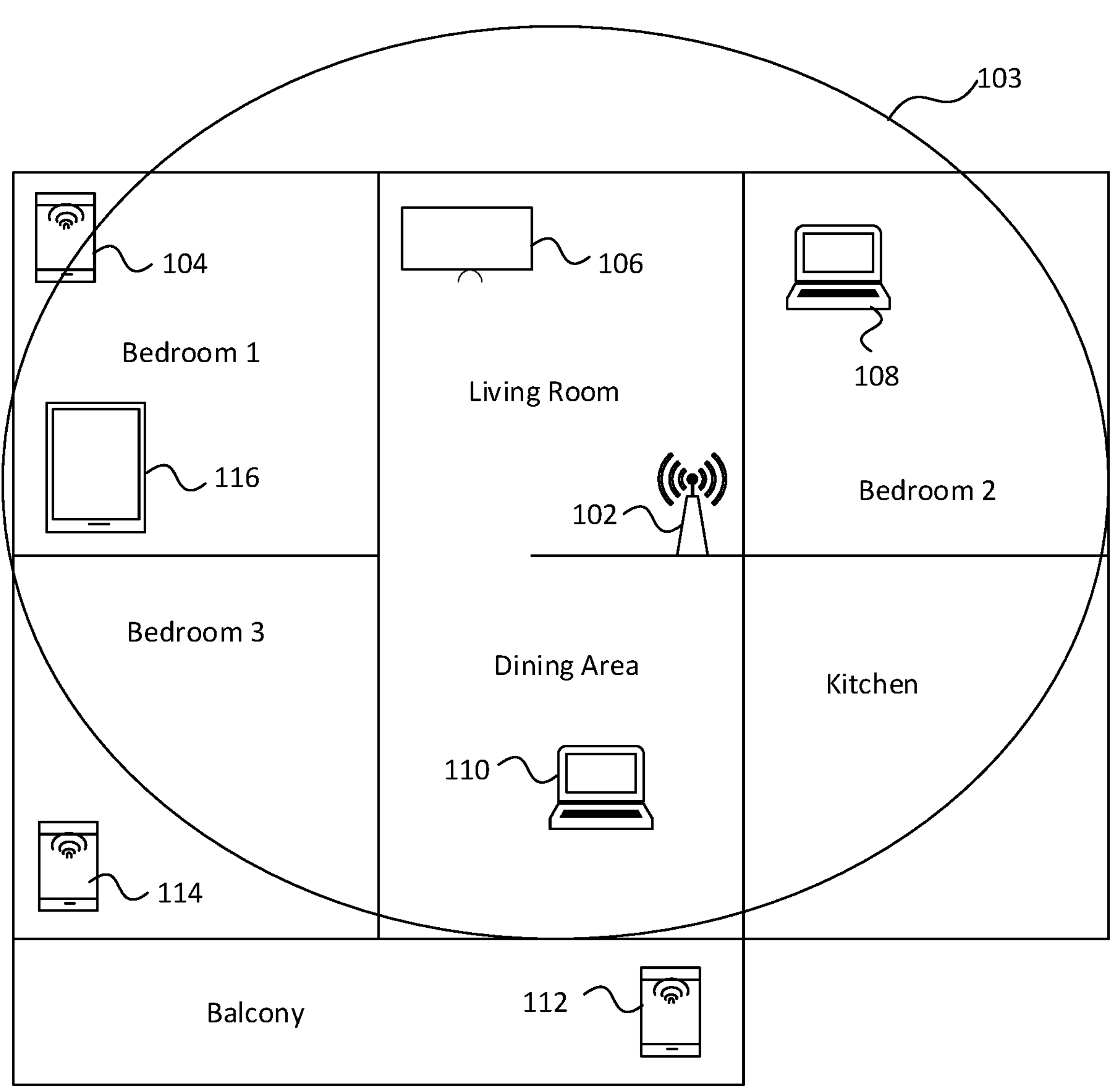
FIG. 1 depicts a sample Wi-Fi network scenario.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

First Aspect of the Disclosure

Having a reliable Wireless Local Area Network (WLAN) connection (e.g., a Wi-Fi connection) has grown from being a mere luxury to a necessity. Particularly in today's working culture, in which working from home is increasingly more prevalent, reliable WLAN connections serve as a backbone for both personal and professional communication.

Although most wireless access points (APs) can provide a reliable WLAN connection in certain areas of the home (e.g. such as areas close to the AP and/or areas unencumbered by obstacles between the area and the AP), many, if not most, WLANs lack coverage or sufficient coverage in each area of the building/dwelling/office in which they are located.

The reality of balancing work and home demands, and even simple personal preference, may dictate a need for wireless access in specifics areas of the home or corresponding building. A reliable WLAN connection, however, may not be available in each of these areas, which may result in portions of the building/dwelling/office being inaccessible for wireless communication (e.g. "dead zones").

The limited wireless connection in these dead zones may be due to a limited range of radiofrequency signals between a user device (UE) in a particular area of the wireless network and the wireless AP. That is, obstacles or other solid objects between the wireless AP in the UE may sufficiently weaken the signal so as to render a wireless connection between the UE and the wireless AP unreliable or even impossible.

One currently available solution to this problem is a commercial Wi-Fi repeater. Such repeater devices extend the range of the wireless network by receiving a signal from the AP and repeating the signal from a location of the wireless repeater and/or receiving a signal from a UE and repeating that receive signal to the wireless AP. Although such devices may improve network functionality, they are single-use devices that are available at additional expense, thereby increasing costs for users to make effective use of their existing wireless networks.

An alternative, existing solution to the limitations of existing Wi-Fi networks is the introduction of a cellular data based Wi-Fi hotspot or the use of cellular tethering. In these solutions, a device (e.g. a UE such as a smart phone, a cellular-data based hotspot, etc.) is connected to a cellular data network and provides access to the cellular data network through a wireless (e.g. Wi-Fi) local network. Although such devices, when introduced into an area of poor Wi-Fi signal, may allow users to utilize wireless network in areas that would otherwise be dead zones, these procedures at additional expense and often have inferior bandwidth.

In a typical home, however, there may already be multiple wireless devices that could be used to improve or extend a wireless network. In addition to the wireless AP and single UE as detailed above, a typical household may include any of one or more laptops, one or more tablet computers, one or more smart phones, a smart TV, one or more smart watches, and one or more Internet of Things (IofT) devices. Such devices may be scattered throughout a home and thus may be present in areas of strong and reliable wireless network reception, areas of diminished perception, and even areas with no appreciable reception. These devices may be stationary (e.g. such as a smart TV) or may be mobile (e.g. such as a smartwatch). As described herein, these devices may be utilized to extend the range of the wireless network by dynamically selecting one or more devices to serve as a repeater.

According to the standard disclosed as Institute of Electrical and Electronics Engineers (IEEE) 802.11ax, also known as Wi-Fi 6 or Wi-Fi 6E, it is possible to operate same device as both a Wi-Fi client (e.g. directly connected to AP for its own wireless TX/RX) and as a soft-AP (e.g. repeater functionality) concurrently or simultaneously.

Using this functionality, it is possible to establish a Wi-Fi mesh network of all nearby wireless devices (e.g. all wireless devices in a house) over a Wi-Fi in-band channel and/or Bluetooth, which may serve as an alternate backup (in case the device in a Wi-Fi blind spot) to eliminate blind spots in house.

To achieve this, all devices share one or more wireless network quality metrics with each other. These one or more wireless network quality metrics may include at least any of received signal strength indicator (RSSI), bandwidth requirements, battery status, whether the device is connected to a mains power supply.

Owing to their location (e.g. their distance from the AP, the presence of solid barriers or obstacles between the device and the AP, etc.), some devices will have better connections to the AP than other devices. Based on a signal strength (e.g. RSSI) between any two devices (e.g. between a laptop and a tablet computer), it can be determined whether a sufficiently strong wireless connection may be established between the two devices. Assuming an acceptable signal strength between an AP and a first device, and an acceptable signal strength between the first device and a second device, the AP may select the first device as a repeater for a transmission between the AP and the second device. Illustratively, a laptop computer in a living room may have a strong connection to the AP, but a tablet computer in a bedroom may not. In this circumstance, a primary device (e.g. another UE in the network, the AP, etc.) may select the laptop computer to operate as a repeater for a communication between the AP and the tablet computer. As such, the AP may transmit a signal for the tablet computer; however, because of the poor connection between the AP and the tablet computer, the tablet computer may not receive this signal. The laptop, however, may receive this signal and repeat the signal for reception by the tablet computer.

Furthermore, this mesh network may be dynamically adapted and/or reorganized in real time. In this way, a new device that enters the local area network may report superior (e.g. better than that of other devices in the local area network) signal strength for communications with a device that is otherwise poorly accessible or inaccessible to the AP. Such new device may be selected as a repeater. Such new device may be selected to replace a previously selected repeater, based, for example, on the superior signal strength.

Moreover, the mesh network may be dynamically adapted and/or reorganized based on context information related to power. In this manner, the devices may share power information, such as whether they are powered by a mains power source; whether they are powered by a battery; and if powered by a battery, an available battery power remaining. That is, because the additional function as a repeater requires additional battery resources, a device having an adequate wireless link to a target device and adequate battery reserves may be selected as a repeater over another device having an adequate wireless link to the target device but in adequate battery reserves. Similarly, a device having an adequate wireless link to a target device and connected to a mains power supply may be selected as a repeater over another device having an adequate wireless link to the target device but relying on battery power.

Furthermore, the repeater device may be selected based on a device's available bandwidth. Depending on the task at hand, a given device may require more bandwidth or less bandwidth than other devices performing different tasks. As a device's bandwidth requirement increases, less bandwidth will be available to the device for transmitting repeated signals. In this situation, it may be preferable to select a device with a lower intrinsic bandwidth requirement.

Furthermore, the selection of the repeater device may be dynamically altered based on a specific absorption rate (SAR) factor. As users operate UEs, the user may commonly place the user's hand or other body part in close proximity to an antenna of the UE. In this circumstance, the antenna's functionality may be impaired. In such circumstances, it may be desirable to select an alternative device for performance as the repeater.

FIG. 1 shows a sample Wi-Fi network scenario in a house. The selection of a house for the context of this Wi-Fi network scenario is made for demonstrative purposes only and is not intended to be limiting. In this exemplary scenario, a wireless EP 102 is present within a central area of the house. The wireless EP 102 sends and receives radio signals within an area of coverage generally defined by 103. Several additional devices capable of wireless communication are also present in the home. Moving clockwise from the top left corner of the figure, a first bedroom includes a smart phone 104; the living room includes a smart TV 106; a second bedroom includes a desktop computer 108; a dining area includes an additional computer 110; the balcony includes an additional smart phone 112; a third bedroom includes a smart phone 114; and the first bedroom also includes a tablet computer 116. Here it can be seen that the smart phone 104 is physically located at an edge of the available wireless coverage 103 from the wireless AP 102 and therefore has a weak wireless connection to the wireless AP 102. The smart phones 112 and 114 are outside of the available wireless coverage 103 and therefore have no wireless connection to the wireless AP 102. In this situation, devices 112 and 114 will be unable to communicate with the wireless AP 102 and may therefore be excluded from the local area network. Without additional assistance, smart phone 104 may have an irregular connection with the AP 102, yielding a poor user experience.

In some configurations, it may be desirable to characterize the overall strength of the connections between the various devices and the wireless AP 102. For example, smart phones 112 and 114 are in a blind spot, relative to the wireless AP 102. Smart phone 104 has a weak connection to the wireless AP 102. The remaining devices have a strong connection to the wireless AP 102.

At this juncture the formation of the mesh network will be described.

All devices may have integrated software to facilitate nearby device communication and discovery. This integrated software may be a part of the operating system (OS) middleware with network device control or it may be part of one or more separate applications. Such software may include an access control mechanism that will ensure that only selected devices can be part of network. In this manner, the mesh network may be of increased security, as such security measures preclude or inhibit nefarious devices from being part of the mesh network.

Each device may periodically broadcast and share any of the following details: an RSSI relative to the wireless AP (e.g. an indication of AP connection status); an RSSI of signals received from nearby devices (e.g. signal strength between devices, which may be decisive in selecting a device as a repeater for a target device); Wi-Fi band details and Quality of network, such as a number of packet drops, re-transmission errors, and any network bandwidth variation etc.; UE context information such as battery status, current network activity, whether the device is connected to a mains power network, whether the device is in motion or stationary, whether the device is engaged in user interaction, or any of these. Using these broadcasts, each or nearly each device will be aware of the connection statuses between each or nearly each device and each or nearly each other device.

These broadcasts may be optionally performed periodically. This period may be set at any duration. Alternatively or additionally, these broadcasts may be performed in response to a trigger, such as in response to a request from the AP and/or a request from any of the other devices. These broadcasts may be performed using Wi-Fi in-band transmissions. Additionally or alternatively, they may be performed using one or more Bluetooth channels.

In some circumstances, some devices may not have sufficient signal connections between them to obtain RSSI and/or to send and receive the above broadcasts. For example, this may be the case between smartphones 104 and 112 in FIG. 1. In light of this, the other devices (e.g. the intermediate devices) may relay the information. In this manner, for example, smartphone may send its broadcast, when may be received, among others, by the dining area computer 110, which may in turn relay the broadcast to smartphone 112. In this optional configuration, the devices may repeat the received broadcasts until each device has received the broadcast from each other device. Illustratively, and in a hypothetical example, each device in FIG. 1 may broadcast according to the procedures described above, but due to their distance, UE 104 will not have received the broadcast of UE 112, and, conversely, UE 112 will not have received the broadcast of UE 104. In the simplified example, however, device 110 has received the broadcast of UE 104, and device 110 repeats the broadcast of UE 104, which is then received by use device 112. Conversely, UE 110 receives the broadcast of UE 112, and UE 110 repeats the broadcast of UE 112, which is received by UE 104. In this manner, each device may receive the broadcast of each other device.

Based on these broadcasts, the network may select one or more primary devices. Primary devices may be selected, for example, based on a strength of the connection to the wireless AP 102. That is, a primary device is expected to have a strong wireless connection to the wireless AP 102. Depending on the configuration, each device with a strong wireless connection to the wireless AP 102 may be selected as a primary device. Alternatively, fewer than all the devices having a strong connection to the wireless AP 102 may be selected as primary devices.

Once a device assumes the role of a primary device, the primary device may instruct other devices (e.g. secondary device and/or other primary devices) to change a band of wireless transmission (e.g. to limit interference).

Figure 2B:
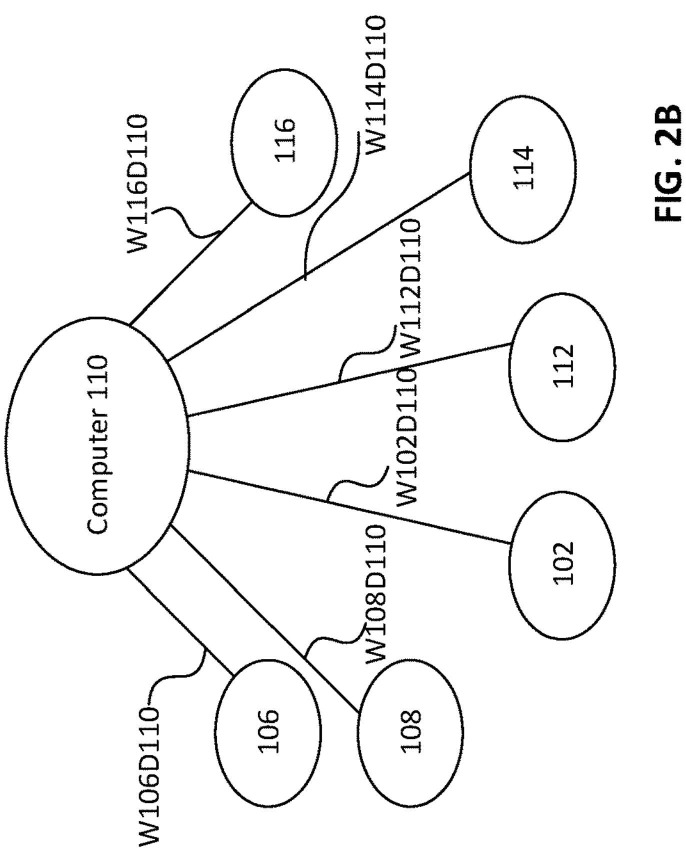
FIGS. 2A and 2B depict node trees according to this aspect of the disclosure.
Figure 2A:
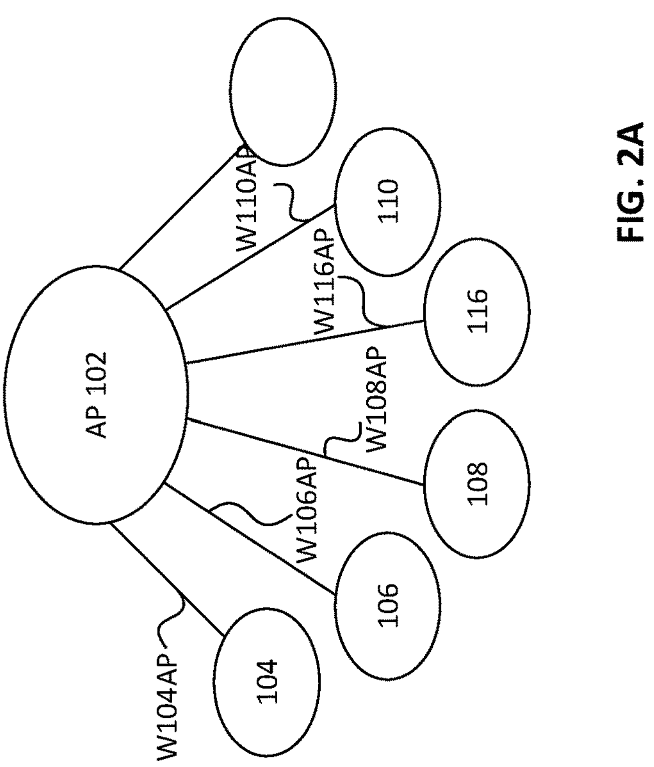

Once a primary device assumes the role of a primary device, the primary device may generate a node tree to indicate the one or more devices that have poor or nonexistent connections to the wireless AP 102. FIGS. 2A and 2B depict node trees according to this aspect of the disclosure. In FIG. 2A, a new tree is depicted between the wireless AP 102 and various devices to which the wireless AP 102 has a connection (e.g. 104, 106, 108, 116, 110 close by the seas. Between each node and the wireless AP 102 is a weight (indicated with a value starting with 'W'), representing a strength of the wireless connection between the device and the wireless AP 102. For example, a strength of the wireless connection between the wireless AP 102 and device 104 is indicated by W104AP; a strength of the wireless connection between the wireless AP 102 and device 106 is indicated by W106AP; a strength of the wireless connection between the wireless AP 102 and device 108 is indicated by W108AP; a strength of the wireless connection between the wireless AP 102 and device 116 is indicated by W116AP; and a strength of the wireless connection between the wireless AP 102 and device 110 is indicated by W110AP. The final node is left blank for demonstrative purposes, indicating one or more spaces for devices to which the wireless AP 102 has no wireless connection (for example, device 114 and device 112). In an alternative configuration, such as when the device broadcasts are repeated throughout the network such that every device receives connection information from every other device, these nodes may be completed with device information but with a low weight or a weight of zero, reflecting a week or nonexistent wireless connection to the wireless AP 102. Conversely, greater weights indicate a stronger connection between the respective device and the hub, in this case the wireless AP 102.

Similarly, and turning to FIG. 2B, the connections and respective weights between the computer 110 and the various nodes are depicted. In this representation, and for demonstrative purposes, computer 110 has a wireless connection to devices 106, 108, 102, 112, 114, and 116. As with FIG. 2A, each wireless connection is given a weight as depicted by W106D110, W108D110, W102D110, W112D110, W114D110, and W116D110.

At this juncture, it is expressly noted that these data are presented in a node tree format for convenience and demonstrative purposes and are not intended to be limiting to the form in which the data are collected or stored. That is, information about the connections between the respective devices and a hub device, including but not limited to the weights of these connections, made the organized and/or stored in any format whatsoever. A nonlimiting list of formats includes a node tree, a lookup table, and associative database, or otherwise.

In whatever format these data are stored, the data associations (referred to as a node tree for convenience) may be repeatedly updated. Such updates may occur through retransmission of the broadcast message as described above. In this manner, the devices maintain an accurate or current list of wireless connections and their strengths. This reflects the dynamic nature of wireless connections. For example, a change in band of any one device may impair a wireless connection of a nearby device to another node. A change in band of the device outside the wireless network may impair one or more wireless connections of devices within the wireless network. Moreover, many devices within the wireless network may be mobile and thus experience dynamic changes in the nodes to which they are connected and/or the strengths of the various connections. For example, devices such as smart phones and tablets may be moved from one room to the other, thereby changing the devices to which they may establish a wireless connection and/or the strengths of their available connections. Furthermore, wireless connections and/or their strengths may change based on obstructions at or near a device's antenna. During the course of use, users may place a body part near a device's antenna, which may limit the antenna's ability to maintain a strong wireless connection with one or more nodes. For example in many devices, and antenna's transmission power will be reduced when it is determined that a user's body part is near the antenna.

Using the information available as described above, a primary device may select a secondary device to be a repeater for a transmission.

In a first configuration, the primary device may select a secondary device is a repeater based solely on the network connections and their strengths, as depicted in FIG. 2A and/or FIG. 2B. In this manner, a primary device may select a secondary device as a repeater in order to communicate with a device that does not have a wireless connection to the AP, or which has only a poor wireless connection to the AP. For example, and using the devices as depicted in FIG. 1, the tablet computer 116 may determine from the broadcasted messages that smart phone 114 does not have a network connection with the AP 102, but that smart phone 114 has a strong wireless connection to computer 110. Based on these available connections, tablet computer 116 (functioning as a primary device in this example) may select laptop computer 110 as a repeater device for smart phone 114. In this manner, transmission sent from the wireless AP 102 to the smart phone 114 are repeated via the computer 110. Conversely, transmissions from the smart phone 114 to the wireless AP 102 are repeated via the computer 110.

Additionally or alternatively, and in an optional second configuration, the primary device may select a device as a repeater by taking power status into account. In this manner, and when multiple devices may be candidates to become a repeater based on their wireless connections to the wireless AP 102, a device of the candidate devices may be selected as a repeater based on an additional criterion of its available power resources. For example, a device that is connected to a mains power source may be selected as a repeater over a device that relies on battery power. Similarly, a battery-power device with a great amount of available battery power may be selected as a repeater over a battery-powered device with a small amount of available battery power. In this configuration, the broadcast messages may include information about available power resources such as whether the device is connected to a mains power supply and/or an available battery resources the device.

Additionally or alternatively, and optionally in combination with any of the above configurations, the candidate device to become a repeater may be selected based on the candidate device's activities. In this manner, a candidate device having great amounts of available computational resources may be selected as a repeater over a candidate device having few available computational resources. Similarly, a candidate device engaged in a latency tolerant activity may be selected as a repeater device over a candidate device engaged in a non-latency tolerant activity (e.g. a voice conversation). In this configuration, the broadcast messages may include information about available computational resources and/or information about the tasks being performed by the respective devices (e.g. types of tasks, latency tolerance of task activities, etc.).

Additionally or alternatively, and optionally in combination with any of the above configurations, the repeater device may be selected from the candidate devices based on whether the device is moving or stationary. This may reflect a preference for stationary devices as repeaters, based on an assumption that a moving device may experience changes in the quality of its wireless connections and/or changes in the devices to which it can establish a wireless connection and may therefore become unsuitable as a repeater for a given device. In this optional configuration, the context information transmitted in the broadcast may include whether the device is mobile or stationary. Alternatively or additionally, if a status of the device changes from mobile to stationary or from stationary to mobile, the device may broadcast an additional message indicating the change of status. Nothing in this optional configuration should be understood as indicating that devices capable of mobility (e.g. smart phones, tablet computers etc.) are necessarily less desirable repeaters than non-mobile devices (e.g. smart TVs, desktop computers, etc.). Rather, in some configurations, it may be preferable to rely on devices that are currently stationary to serve as repeaters.

Similarly, it may be preferred to rely on devices that are stationary as primary devices. In this manner, a primary device that transitions from stationary to mobile may, in some configurations, lose its status as a primary device.

In the above configurations, the various devices may include in the broadcast message information in addition to their available wireless connections and their strengths. This additional information may be referred to herein as context information. As described above, the context information may include, but is not limited to, whether the device is connected to a mains power supply, and available power resource of the device, a computational task of the device, available computational resources of the device, a latency tolerance of the device, or otherwise.

Figure 3:
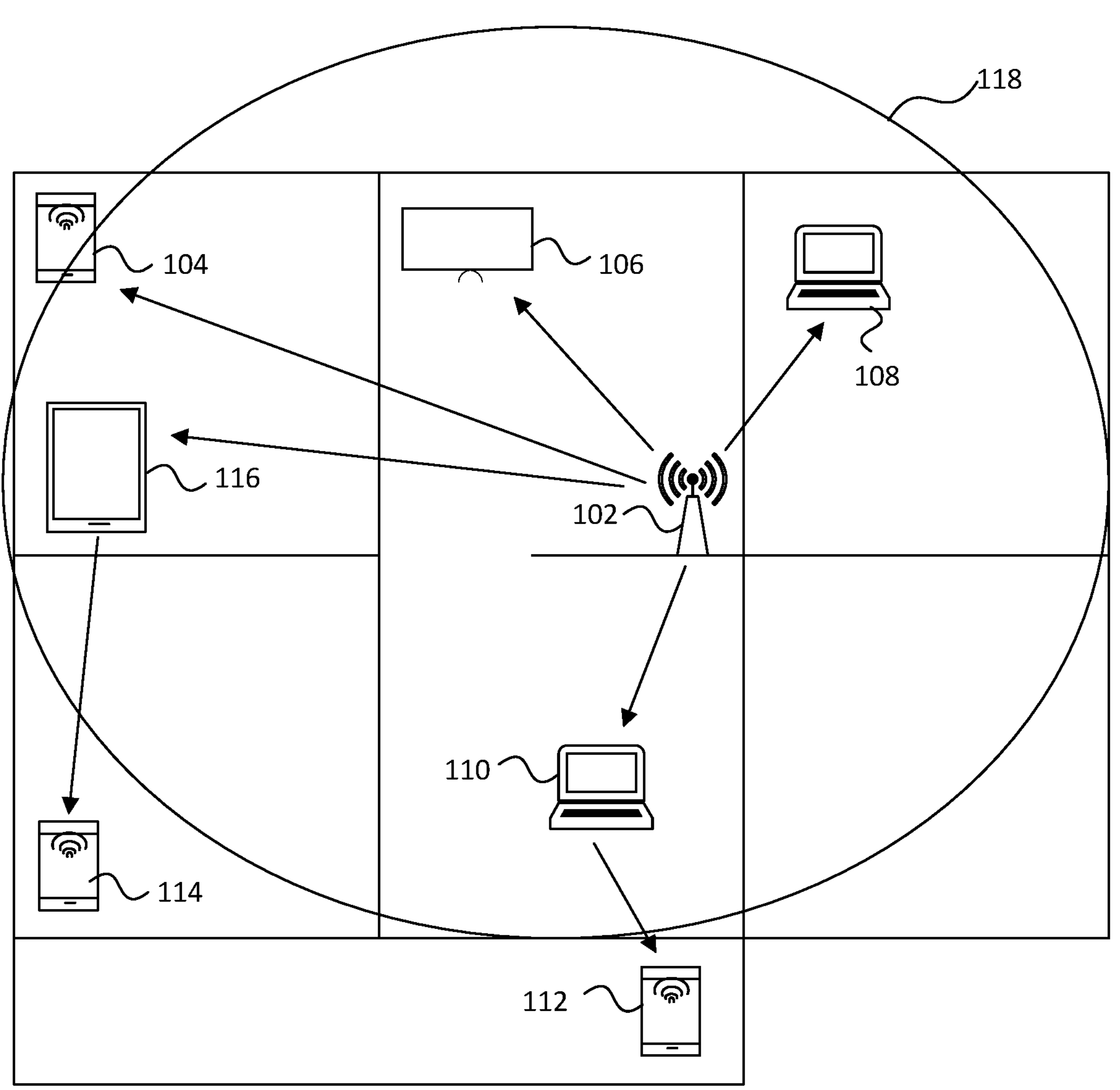
FIG. 3 depicts a primary and secondary device arrangement.

FIG. 3 depicts a primary and secondary device arrangement. In this configuration, each of devices 106, 108, 110, and 116 has a strong wireless connection to the wireless AP 102. Device 104 has a weak wireless connection to the wireless AP 102. Devices 112 and 114 have no wireless connection to the wireless AP. Each of the devices broadcasts its connections to every other device and their respective weights as described above. Furthermore, these broadcast messages may be repeated in order to assure that the device is not otherwise connected to the AP 102, such as devices 112 and 114, also receive and share the relevant broadcast messages. In this configuration, any or all of devices 106, 108, 110, and 116 may be selected as primary devices, based on their strong connection to the wireless AP 102. Owing to the various network connections, and optionally to the context information as described above, a primary device selects device 110 to serve as a repeater for device 112. Similarly, a primary device selects device 116 to serve as a repeater for device 114. In this manner, each of devices 114 and 112 are connected to the wireless AP 102 through their respective repeater devices.

In this example, each of devices 110 and 116 may operate simultaneously or concurrently in both client mode and repeater mode. In client mode, the devices 110 and 116 may connect with the wireless AP 102 to perform tasks within their own respective application stacks (e.g. running programs locally, performing voice calls locally, performing video calls locally, etc.). In repeater mode, the devices 110 and 116 perform the repeater functions as disclosed above. The simultaneous or concurrent performance of both client mode and repeater mode may be performed in accordance with Wi-Fi 6E.

Additionally or alternatively, and optionally in combination with any of the above configurations, the devices may be configured to perform a runtime switchover of the repeater. This may occur, for example, if the device becomes mobile and suddenly changes from having a poor or non-existent wireless connection to the wireless AP 102 to having a good connection to the wireless AP 102. In this example, a device previously relying on a repeater for its connection to the wireless AP 102 now has its own independent connection with the wireless AP 102 and therefore no longer needs the repeater. In this example, the device may broadcast its new connection to the wireless AP 102 and therefore inform the other network devices that the repeater function is no longer necessary.

Similarly, the device selected as the repeater may be changed if another device becomes preferable. For example, in the example in which computer 110 serves as a repeater for smart phone 112, if smart phone 114 moves into the wireless network 118 such that it has a wireless connection to both the wireless AP 102 and the smart phone device 112, the smart phone 114 may be selected as a repeater over the computer 110. This may occur according to any of the above configurations, such as, for example, if the computer lacks available competition will resources, if the computer is engaged in a non-latency tolerant task, if smart phone 114 becomes connected to a mains power supply, etc.

Moreover, the repeater may be changed if the current repeater develops a condition that makes it less desirable to serve as a repeater than another device. This may include, but is not limited to, a change in available power resources, the execution of a non-latency tolerant task, a limitation of available computational resources, a change in its wireless connection to the recipient device and/or the wireless AP 102. For example, and returning to FIG. 3, the tablet computer 116 may be selected as a repeater for smart phone 114. Should tablet 116, however, become disconnected from a mains power supply, deplete its battery significantly, engage in a non-latency tolerant task, or deplete its computational resources, tablet 116 may become undesirable to serve as a repeater compared to another device. In this configuration, another device may be selected as a repeater instead.

Figure 4:
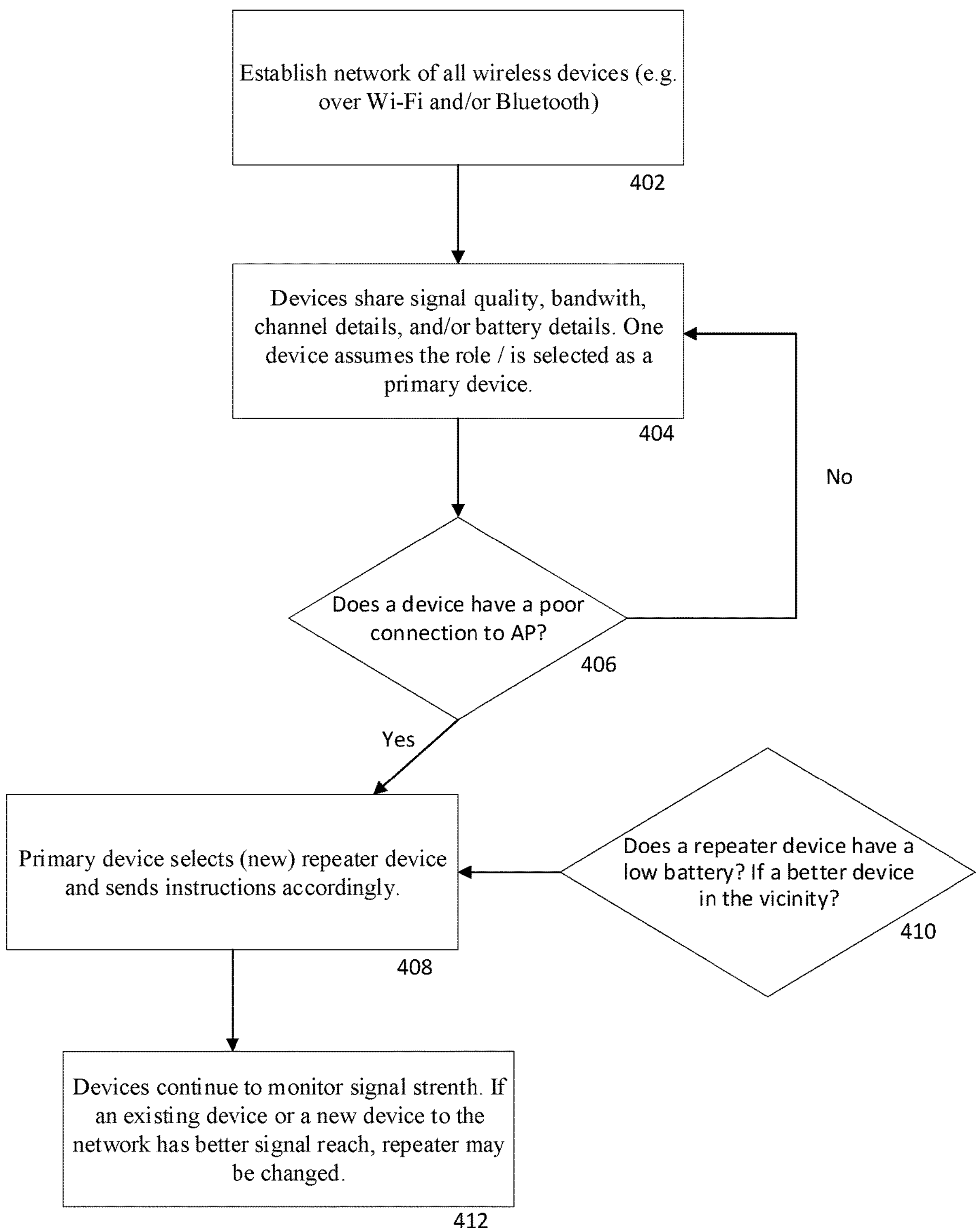
FIG. 4 depicts a flowchart for the selection of a repeater device.

FIG. 4 depicts a flowchart for the selection of a repeater device. As depicted in this figure, each device may attempt to establish a network connection to all other wireless devices 402. Such wireless connections may be Wi-Fi connections as described herein. Alternatively or additionally, the wireless connections may be Bluetooth connections. In some circumstances, each device may be unable to connect to each other device, depending on an availability of a wireless link. The devices record the other devices to which they may establish a wireless connection and a strength of the respective wireless connection (e.g. RSSI, or otherwise).

After establishing the available wireless connections, the devices may share signal quality, bandwidth, channel details, battery details, or any of these 404. A device assumes the role of, or is selected as, a primary device.

The primary device determines based on the broadcast messages whether another device has a poor connection to the wireless AP 406. If a poor connection to the wireless AP exists, then the primary device selects a repeater device and sends instructions accordingly 408. If no device having a poor connection to the EP is identified, then no repeater device is identified, and the devices may at a later time share the information described in 404. Should any existing repeater device have a low battery, or should there be a more suitable repeater device in the vicinity 410, the primary device may select a new repeater device and send instructions accordingly 408. The devices then continue to monitor signal strength. If an existing device or new device to the network has better signal reach, a new repeater may be selected accordingly 412.

FIG. 5 discloses a computing device 502, according to the first aspect of the disclosure. The computing device may include one or more processors 504, configured to receive first data corresponding to a first radiofrequency signal received from a first wireless communication device, and second data corresponding to a second radiofrequency signal received from a second wireless communication device; select either the first wireless communication device or the second wireless communication device as a repeater device based on the first data or the second data according to one or more repeater selection criteria; and instruct a transceiver 506 to send a third radiofrequency signal to the repeater device, wherein the third radiofrequency signal includes third data and an instruction for the repeater device to repeat the third data to the third wireless communication device.

FIG. 6 discloses a method including receiving first data corresponding to a first radiofrequency signal received from a first wireless communication device, and second data corresponding to a second radiofrequency signal received from a second wireless communication device 602; selecting either the first wireless communication device or the second wireless communication device as a repeater device based on the first data or the second data according to one or more repeater selection criteria 604; and controlling a transceiver to send a third radiofrequency signal to the repeater device, wherein the third radiofrequency signal includes third data and an instruction for the repeater device to repeat the third data to the third wireless communication device. 606

As shown above with respect to at least FIG. 5 and FIG. 6, the computing device is configured to receive first data corresponding to a first radiofrequency signal received from a first wireless communication device and second data corresponding to a second radiofrequency signal received from a second wireless communication device. The first data may include information about a transmission between the first wireless communication device and a third wireless communication device. The second data may include information about a transmission between the second wireless communication device and a third wireless communication device.

The selection of a primary device and/or the selection of a repeater device may occur in whole or in part based on information about a signal strength between a given device and the wireless AP and/or a signal strength between the given device and a device with a poor or nonexistent connection to the wireless AP. In this manner, the first data may include a signal strength between the first device and a wireless AP, and wherein the repeater selection criteria include selection of the repeater device based on the signal strength. The signal strength may be any indicator of signal strength whether implicit or explicit. The signal strength may be an RSSI, a number of packet drops, a number of retransmissions, and modulation scheme, or any other value tending to indicate a strength of the connection between the devices.

The second data may include a signal strength between the second device and the wireless AP, and wherein the repeater selection criteria include selection of the repeater device based on the signal strength. In this manner, it is ensured that a repeater having a strong signal connection to the wireless AP is selected. This precludes the undesirable situation that a device is selected as the repeater when that repeater device itself has a poor connection to the AP, which could render the repeating function largely unworkable.

Figure 7:
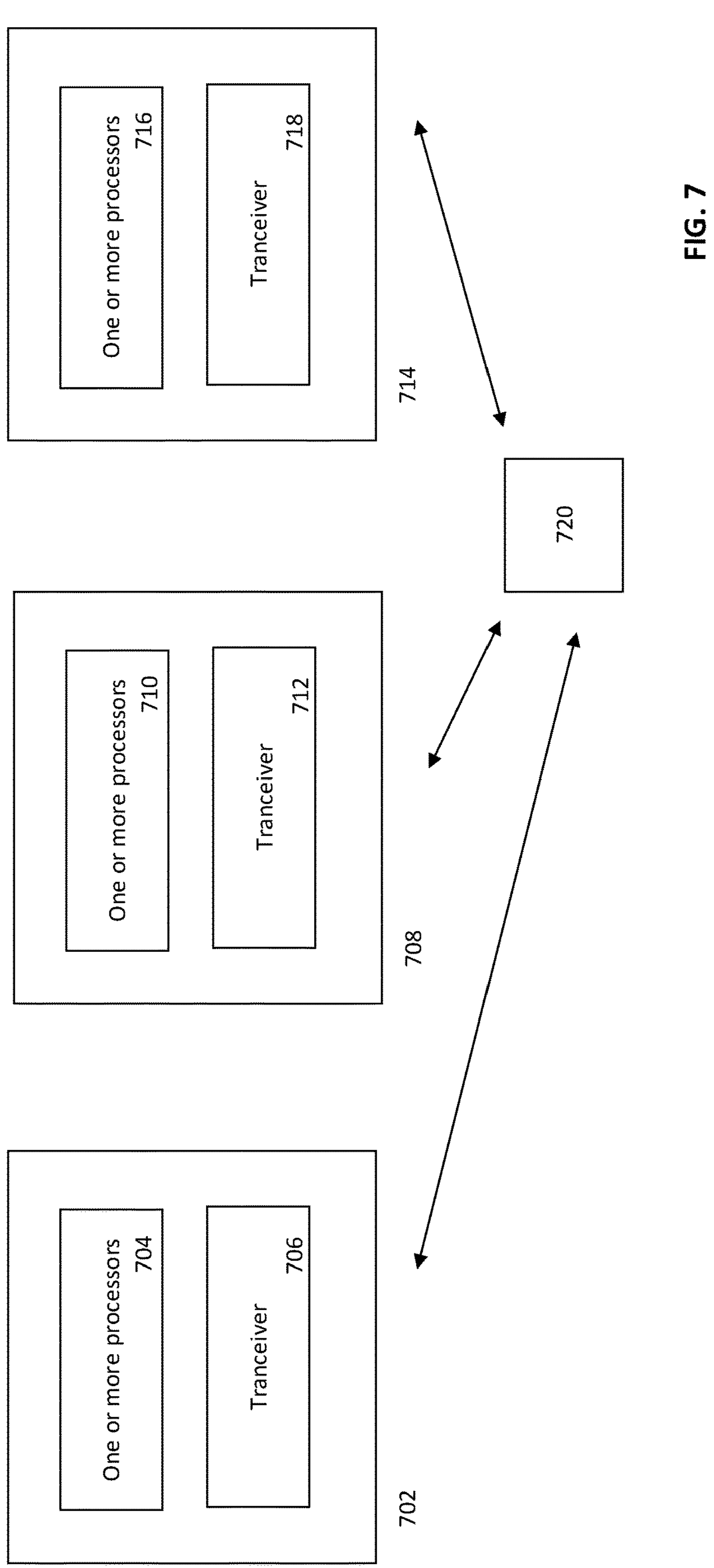
FIG. 7 depicts a communication device network.

FIG. 7 depicts a communication device network including a plurality of wireless communication devices 702, 708, and 714, each wireless communication device including one or more processors (704, 710, and 716) and being wirelessly connected to a common network AP 720; wherein each of the plurality of wireless communication devices (702, 708, and 714) is configured to send a wireless transmission including a primary device selection factor; wherein each of the plurality of wireless communication devices is configured to select a primary wireless communication device based on the primary device selection factor; wherein the primary device is configured to: receive first data corresponding to a first radiofrequency signal received from a first wireless communication device, and second data corresponding to a second radiofrequency signal received from a second wireless communication device; select either the first wireless communication device or the second wireless communication device as a repeater device based on the first data or the second data according to one or more repeater selection criteria; control a transceiver (706, 712, and 718) to send a third radiofrequency signal to the repeater device, wherein the third radiofrequency signal includes third data and an instruction for the repeater device to repeat the third data to the third wireless communication device.

As indicated above, other specific criteria may function as an indicator of connection strength or signal strength between two devices. One such indicator may be or include a number of packet drops, such as a number of packet drops between the first device and the wireless AP, or a number of packet drops between the wireless AP and a second device (e.g. the repeater). In this manner, the repeater selection criteria may include selection of the repeater device based on the number of packet drops. Similarly, wherein the repeater selection criteria may include selection of the repeater device based on the number of packet drops.

Similar to the use of the number of packet drops as a representation of a signal strength or connection strength, the first data and/or the second data may include a number of retransmission errors. The number of retransmission errors may be understood as generally being inversely proportional to the signal strength or connection strength. In this manner, the first data may include an indicator of a number of retransmission errors between the first device and the wireless AP, and the repeater selection criteria may include selection of the repeater device based on the number of retransmission errors. Similarly, the second data may include an indicator of a number of retransmission errors between the second device and the wireless AP. Accordingly, the repeater selection criteria may include selection of the repeater device based on the number of retransmission errors.

As stated above, selection of the primary device and or the repeater may be performed, at least in part, on the basis of context information. This context information may be optionally shared among the devices as part of the broadcasts in which the connection strength to the wireless AP is shared. The device context information may include a battery status of the first device. In this manner, a battery status may be considered in selecting the first device. For example, a first device having a fully charged battery may be selected over a candidate first device having a depleted battery. The device context information may include a current network availability for a network to which the first device is connected. The device context information may include whether the first device is connected to a mains power network. A device with a connection to a mains power network may be preferred for selection as a first device over a device relying on battery power. The device context information may include whether the first device is stationary or in motion. This may reflect a preference for first devices to be stationary, as a stationary device may be more likely than a mobile device to have persistent, strong connections to a wireless AP or other relevant device. The device context information may include an activity in which the first device is engaged. This may permit selection of devices that have sufficient computational resources and/or selection of devices that are engaged in latency tolerant activities.

Any of the elements described as part of the selection criteria or context information with respect to the selection of the first device, above, may also be part of the selection criteria or context information for selection of a second device (e.g., a repeater device). In this manner, the repeater selection criteria may include any of a battery status of the first device, a current network availability for a network to which the first device is connected, whether the first device is connected to a mains power network; whether the first device is stationary or in motion.

Similarly, the repeater device context information may include any of a battery status of the second device, a current network availability for a network to which the second device is connected, whether the second device is connected to a mains power network; whether the second device is stationary or in motion; or an activity in which the second device is engaged; and wherein the repeater selection criteria include any of a battery status of the first device, a current network availability for a network to which the first device is connected, whether the first device is connected to a mains power network; whether the first device is stationary or in motion.

In an optional configuration, the primary device may include an artificial neural network. The artificial neural network may be configured according to any machine learning technique. The artificial neural network may be configured to select either the first wireless communication device or the second wireless communication device as the repeater device based on the first data, the second data, and the one or more repeater selection criteria.

Second Aspect of the Disclosure

In the following, and according to a second aspect of the disclosure, a power management system is disclosed, in which, from each secondary device (e.g. spoke) of a plurality of secondary devices, a primary device (e.g. a hub, one or more processors of the hub, an internet protocol Application Programming Interface (API), etc.) may receive a parameter such as a number of active workloads and corresponding compute/power available for secondary device (e.g. spoke) in the hub/spoke configuration. The primarily device (which may typically be a PC) may analyze the received data and perform one or more calculations for application profiling with respect to compute demand, which may be mapped to the power state of the devices. The primary device may then issue re-optimization instructions to the secondary devices for overall improved power efficiency and/or overall thermal efficiency.

The primary device may generate a scoring or ranking based on a scoring and ranking scheme, using a user interaction profile. The primary device may implement the principles and methods described herein to generate an incremental workload/power state optimization request to one or more secondary devices with continuous probing. The primary device may utilize one or more central steps or calculations in determining a local priority, exception handling within the level of the secondary devices. The primary device may perform relative power efficiency probing, such as based on user analytics and/or one or more artificial neural networks.

According to a second aspect of the disclosure, a global power efficiency paradigm may be generated, in which multiple smart devices are interconnected in a primary and secondary model (e.g., a hub and spoke model). This modem may consider any of user activity, class of application/workload, and power state of each device to determine an optimized workload.

Figure 8:
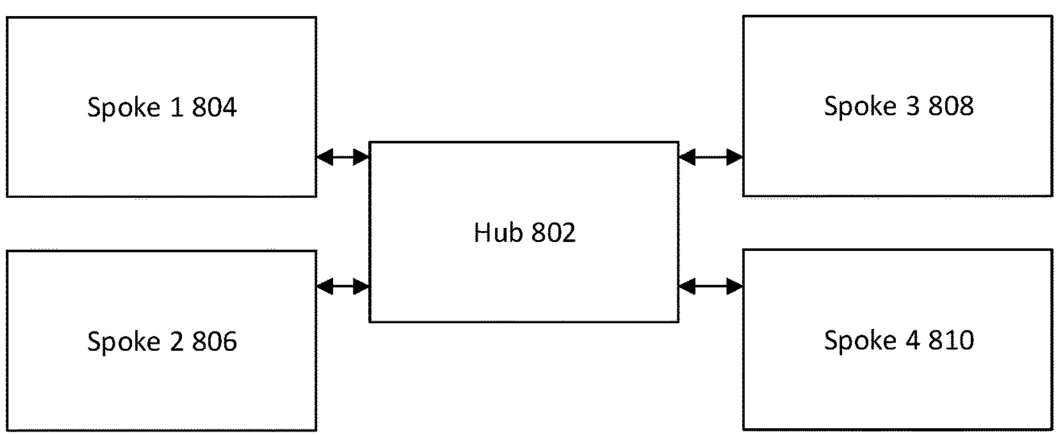
FIG. 8 depicts a primary and secondary device system.

FIG. 8 depicts a primary and secondary device system configured as a hub and spoke arrangement. In this figure, a primary device (e.g. hub) 802 is connected to each of a first secondary device (spoke one) 804, a second secondary device (spoke 2) 806, a third secondary device (spoke 3) 808, and a fourth secondary device (spoke 4) 810.

Each of the secondary devices 804, 806, 808, 810 may represent any of a collection of class of smart devices. These secondary devices may be centrally connected to a high-compute Hub device (which may typically be, but need not be, a personal computer). Although it is anticipated that these connections may generally be wireless, the principles and methods disclosed herein will also function in the context of a wired connection.

The data connections between the primary device and secondary devices may be achieved, in one example, using a peer-to-peer (P2P) connection. In this configuration, and should a P2P connection be utilized, any known P2P may be the basis of these communications.

The principles and methods disclosed herein utilize information received from these P2P communications to determine an optimized workload for improved power efficiency.

In an initial step, the hub device may optionally institute a polling of the spoke devices. In a first configuration, the polling may include requests for information about applications being executed on the various secondary devices. Alternatively or additionally, in a second configuration, the polling may include power information from the various secondary devices. This power information may include whether the secondary device is connected to a mains power supply if the secondary device is not connected to a mains power supply, the power information may include an available power resource for the secondary device (e.g., remaining battery power, a battery voltage, etc.). The hub device may initiate the polling based on a timer. In this manner, the polling occurs on a periodic schedule at a predetermined interval.

In a first alternative for the polling schema, the polling may be triggered by one or more factors such as a change in a status of the primary computer and/or a report of a change in the status of a secondary computer. In a second alternative for the polling schema, the secondary devices may be configured to transmit their polling information according to a predetermined schedule. For example, the polling schedule may be a periodic schedule according to a known interval.

The polling information may include a workload report and a power report. The workload report may include identifiers of applications running on a respective secondary computing device of the plurality of respective computing devices. In this manner, each secondary computing device may provide the primary computing device with information about its computational activities. Alternatively or additionally, the workload report may include information about the secondary computing device's available computational resources. Alternatively or additionally, the workload report may include a user interaction value, which may represent user interaction with the applications being executed by the respective secondary computing device of the plurality of computing devices. In this manner, determining an optimized workload for the plurality of secondary computing devices may include ranking the applications within a class based on the user interaction value.

The power report may include a power resource value. The power resource value may indicate whether a secondary computing device of the plurality of secondary computing devices is connected to a mains power supply. Alternatively or additionally, the power resource value may indicate a battery power available to the secondary computing device. In this manner, determining the optimized workload for the plurality of secondary computing devices may include assigning a class of applications based on the power resource value. Alternatively or additionally, the power report may include a power demand of one or more applications performed by a corresponding secondary computing device. In this manner, wherein generating the optimized workload may include generating the optimized workload based on the power demand by the one or more applications.

Each spoke may send a workload report and a power report to the hub. In this manner, the hub may receive the spoke devices' reports with respect to their applications/workloads currently active and the power state of each device.

The hub may optionally obtain a user activity/interaction profile status for any or all of the hub devices. This user activity/interaction profile status may provide the hub with information as to a of user priority for a given spoke (e.g. a priority for a user to use the given spoke). The spoke may optionally send additional intermediate status parameters between two polling instances. Such an additional intermediate status parameter may be useful if, for example, a significant change is detected. A nonlimiting list of such significant changes includes a change in status (e.g. active to inactive, inactive to active), a change in network connectivity, a change in location, a change in use by a user, a change in battery status, a change in power source, etc.

Upon receiving the workload report and the power report from each spoke (note that the hub may also optionally receive internally-imposed application level exceptions and/or restrictions that cannot be externally overridden), the hub may perform a series of classification/ranking and mapping operations to cluster applications within a given class (e.g., video games/streaming, GPS-based applications, crypto mining, vector/compute applications, etc.) for spoke assignment, such as assignment based on battery capacity, core/memory usage, etc. The hub may then send optimized application/workload-assignments to each spoke.

In an optional configuration, the hub may include an artificial neural network, which may be configured to generate an optimized workload report. The artificial neural network may be configured according to any known machine learning schema. In this manner, the artificial neural network may function as a type of auto-tuner that monitors power efficiency differences between the various local optimizations at the spoke level and the global optimization at the hub level. Based on these differences, the artificial neural network may tune the clustering/ranking/assignment procedures iteratively (e.g. over a period of time).

Figure 9:
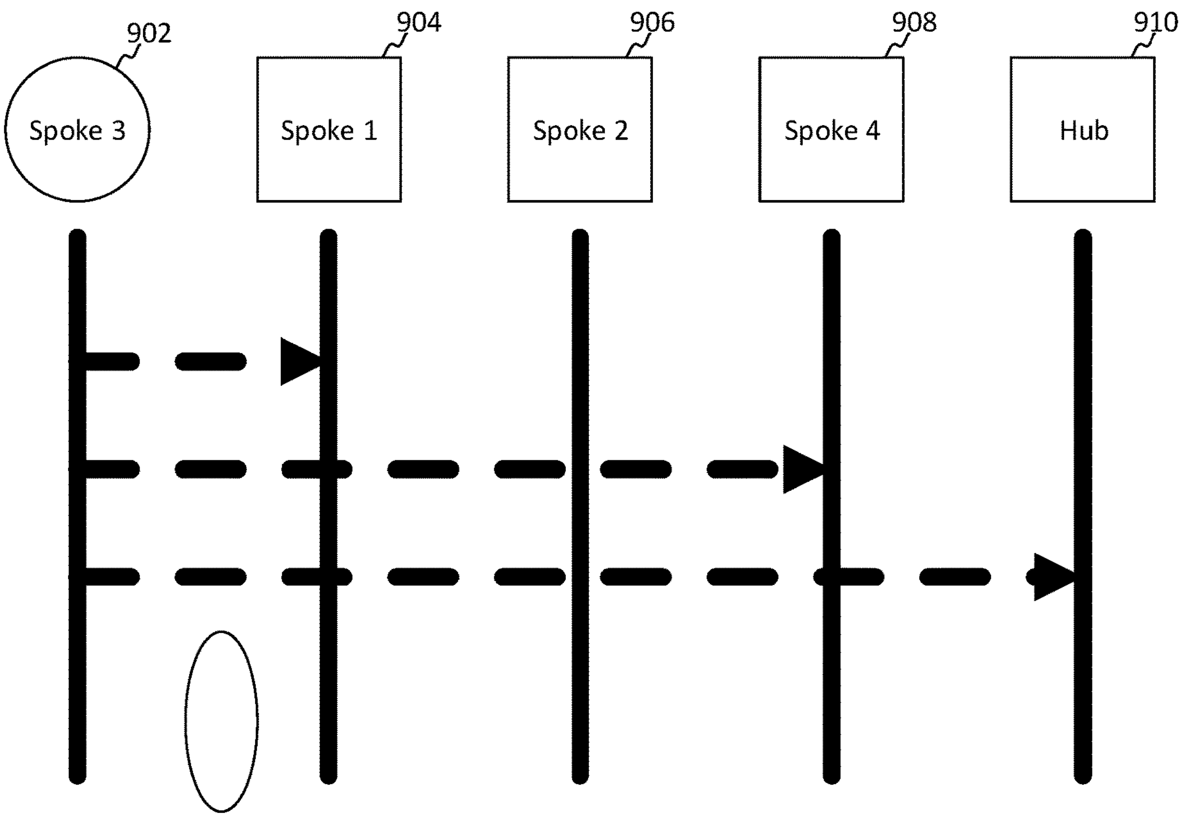
FIG. 9 depicts workload migration to connected spokes.

FIG. 9 depicts an illustrative scenario in which workloads of a highly active spoke (e.g., spoke3) are migrated to connected spokes and the hub based on relative current usage and compute/battery state of each device. In this figure, a secondary device (spoke 3) 902 has a high user activity score, with moderate computational availability, and is not connected to a mains power supply. This high user activity score may be, for example, due to a user presentation using the spoke 3 device 902. Given the high user activity, the moderate computational resource availability, and the lack of connection to a mains power supply (e.g. given the limited computational resources), an optimal power assignment may include offloading one or more tasks to other devices, such as devices with a low user activity score, devices with significant available computational resources, devices that are connected to a mains power supply, devices that have a significant amount of batters resources, or any of these.

Continuing with respect to FIG. 9, the spoke 1 device 904 has a low user activity score, a significant amount of computational resources available, and is not connected to a mains power source. The spoke 2 906 device has a high user activity score, little remaining computational resources and is not connected to a mains power supply. The spoke 4 908 device has a low user activity score, moderate available computational resources, and is currently charging from a mains power supply. The hub 910 has a moderate user activity score, significant available computational resources, and is currently connected to a mains power supply. In light of this, the hub 910 may instruct spoke 3 902 to offload one or more tasks. In this manner, the spoke 3 902 may offload, for example, a mapping task to spoke 1 904, a vector computation task to spoke 4 908, and a crypto mining task to the hub 910. In this illustrative example, spoke 2 906 did not receive and offloaded computational task because its own computational resources are currently taxed. By offloading these resources, spoke 3 902 is better able to manage its user presentation, and many power intensive tasks are directed to computing entities that are connected to a mains power supply.

In an optional configuration, the communication between the hub and the spokes may occur via one or more P2P protocols. Many such P2P protocols take place within P2P groups in which one device is a P2P group owner and the remaining devices are P2P clients. In this optional configuration, the hub may assume the role of the P2P group owner, and the spokes may assume the roles of P2P clients.

In an optional configuration, the hub may determine the optimized workload based on an optimization score. The optimization score may be or include a weighted average or a factor that includes weighted values corresponding to the criteria for the workload report and power report as described above. Specifically, the optimization score may include weighted values corresponding to a user activity score, available computational resources, whether the device is connected to a mains power supply, available battery resources, or any of these.

Figures 10, 11:
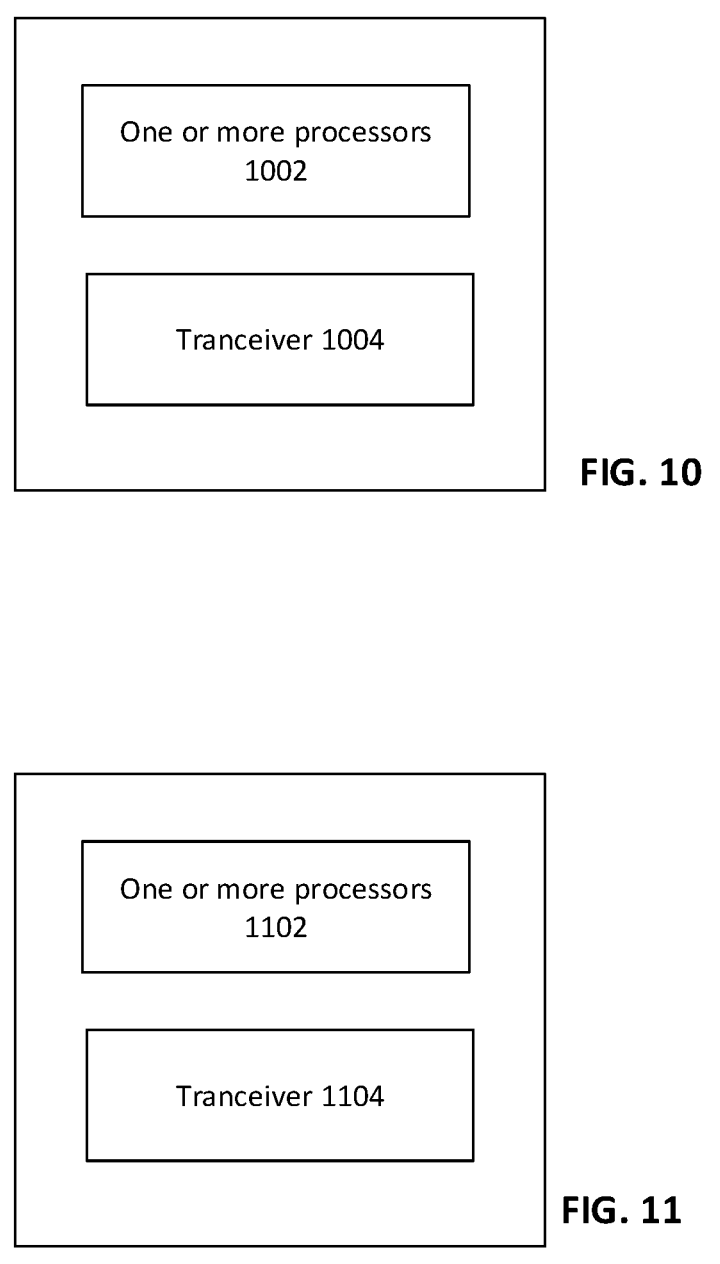

FIG. 10 depicts a primary computing device, including one or more processors 1002, configured to receive a workload report and a power report from each of a plurality of secondary computing devices, wherein each workload report includes identifiers of applications running on a respective secondary computing device of the plurality of respective computing devices; generate an optimized workload for the plurality of secondary computing devices based on the workload reports and the power reports; and instruct a transceiver 1004 to send a radiofrequency signal including the optimized workload. Generating the optimized workload may include assigning an application currently executed by a first secondary computing device to a second secondary computing device.

In a first optional configuration, determining the optimized workload for the plurality of secondary computing devices may include grouping the applications executed by the secondary computing devices by class and assigning a class of applications to a secondary computing device of the one or more secondary computing devices. In this manner, applications involving similar computational resources and/or similar power resources may be clustered and assigned to a same device in an optimized workload.

In a second optional configuration, and additionally or alternatively to the above optional configuration, the power report may include a power resource value. The power resource value may indicate whether a secondary computing device of the plurality of secondary computing devices is connected to a mains power supply and/or wherein the power resource value indicates a battery power available to the secondary computing device; and wherein determining the optimized workload for the plurality of secondary computing devices further includes assigning a class of applications based on the power resource value. The hub device may be configured to generate the optimized workload, taking the power report into consideration.

In a third optional configuration, and additionally or alternatively to any of the above optional configurations, the power report may include a power demand of one or more applications performed by a corresponding secondary computing device. Certain applications or tasks may be associated with high power demands or low-power demands, and these respective power demands may be taken into consideration in generating an optimized workload. In this manner, generating the optimized workload may include generating the optimized workload based on the power demand by the one or more applications.

In a fourth optional configuration, and additionally or alternatively to any of the above optional configurations, the workload report may further include a user interaction value. The user value may represent user interaction with the applications being executed by the respective secondary computing device of the plurality of computing devices. In this manner, determining the optimized workload for the plurality of secondary computing devices may include ranking applications within a class based on the user interaction value.

In a fifth optional configuration, and additionally or alternatively to any of the above optional configurations, the primary device may be configured to receive the workload report and the power report, and to send the optimization report, using a peer-to-peer wireless network connection. As stated above, the primary device (e.g. hub) may be configured as a P2P group owner and may effectuate communication with the spoke devices via one or more P2P communication protocols.

In a sixth optional configuration, and additionally or alternatively to any of the above optional configurations, the one or more processors may be further configured to send an instruction for each of the secondary computing devices to send the workload report and the power report. In this manner, the hub may prompt the sending of a workload report, such that the spoke devices send a workload report in response to a prompting by the hub. This configuration allows the hub to (dynamically) set an interval at which the reports are requested and/or request reports aperiodically as desired, such as upon determination of a change (e.g. a changed user activity status, a change in computational resources, a change in power status, etc.).

In a seventh optional configuration, and additionally or alternatively to any of the above optional configurations, the primary computing device may further include an artificial neural network. The artificial neural network may be configured to generate the optimized workload based on the workload report and the power report. In this manner, the one or more processors generating the optimized workload may include the one or more processors generating the optimized workload using the artificial neural network. The artificial neural network may be optionally configured to receive a power efficiency indicator from each of the secondary computing devices. In this manner, generating the optimized workload further may include generating the optimized workload based on the power efficiency indicators.

In an eighth optional configuration, and additionally or alternatively to any of the above optional configurations, the primary computing device may be configured as a hub device. In this manner, the primary computing device may be configured to connect to the plurality of secondary computing devices as a plurality of spoke devices.

Turning to the spokes, FIG. 11 depicts a secondary computing device including one or more processors 1102, configured to send a workload report and a power report to a primary computing device, wherein the workload report includes identifiers of applications running on the secondary computing device; receive an optimized workload from the primary computing device; and assume execution of an application from another secondary computing device based on the optimized workload or discontinue executing an application to be assumed by another secondary computing device based on the optimized workload. The one or more processors may be configured to control a transceiver 1104 to send the workload report. The transceiver 104 may be configured to receive from the hub a wireless signal representing the optimized workload, to demodulate the signal, and to send data of the demodulated workload to the one or more processors.

FIG. 12 depicts a method including receive a workload report and a power report from each of a plurality of secondary computing devices, wherein each workload report includes identifiers of applications running on a respective secondary computing device of the plurality of respective computing devices 1202; generating an optimized workload for the plurality of secondary computing devices based on the workload reports and the power reports 1204; and instructing a transceiver to send a radiofrequency signal including the optimized workload 1206.

Additional aspects of the disclosure will be demonstrated by way of example.

In Example 1, a computing device, including one or more processors, configured to receive first data corresponding to a first radiofrequency signal received from a first wireless communication device, and second data corresponding to a second radiofrequency signal received from a second wireless communication device; select either the first wireless communication device or the second wireless communication device as a repeater device based on the first data or the second data according to one or more repeater selection criteria; instruct a transceiver to send a third radiofrequency signal to the repeater device, wherein the third radiofrequency signal includes third data and an instruction for the repeater device to repeat the third data to the third wireless communication device.

In Example 2, the computing device of Example 1, wherein the first data include information about a transmission between the first wireless communication device and a third wireless communication device, or wherein the second data include information about a transmission between the second wireless communication device and a third wireless communication device.

In Example 3, the computing device of Example 1 or 2, wherein the first data include a signal strength between the first device and a wireless AP, and wherein the repeater selection criteria include selection of the repeater device based on the signal strength.

In Example 4, the computing device of any one of Examples 1 to 3, wherein the second data include a signal strength between the second device and the wireless AP, and wherein the repeater selection criteria include selection of the repeater device based on the signal strength.

In Example 5, the computing device of any one of Examples 1 to 4, wherein the first data include an indicator of a number of packet drops between the first device and the wireless AP, and wherein the repeater selection criteria include selection of the repeater device based on the number of packet drops.

In Example 6, the computing device of any one of Examples 1 to 5, wherein the second data include an indicator of a number of packet drops between the second device and the wireless AP, and wherein the repeater selection criteria include selection of the repeater device based on the number of packet drops.

In Example 7, the computing device of any one of Examples 1 to 6, wherein the first data include an indicator of a number of retransmission errors between the first device and the wireless AP, and wherein the repeater selection criteria include selection of the repeater device based on the number of retransmission errors.

In Example 8, the computing device of any one of Examples 1 to 7, wherein the second data include an indicator of a number of retransmission errors between the second device and the wireless AP, and wherein the repeater selection criteria include selection of the repeater device based on the number of retransmission errors.

In Example 9, the computing device of any one of Examples 1 to 8, wherein the first data include device context information, wherein the device context information includes any of a battery status of the first device, a current network availability for a network to which the first device is connected, whether the first device is connected to a mains power network; whether the first device is stationary or in motion; or an activity in which the first device is engaged; and wherein the repeater selection criteria include any of a battery status of the first device, a current network availability for a network to which the first device is connected, whether the first device is connected to a mains power network; whether the first device is stationary or in motion.

In Example 10, the computing device of any one of Examples 1 to 9, wherein the second data include device context information, wherein the device context information includes any of a battery status of the second device, a current network availability for a network to which the second device is connected, whether the second device is connected to a mains power network; whether the second device is stationary or in motion; or an activity in which the second device is engaged; and wherein the repeater selection criteria include any of a battery status of the first device, a current network availability for a network to which the first device is connected, whether the first device is connected to a mains power network; whether the first device is stationary or in motion.

In Example 11, the computing device of any one of Examples 1 to 10, wherein the first data or the second data include an indicator of network bandwidth variation.

In Example 12, the computing device of any one of Examples 1 to 11, wherein the computing device is configured to receive the first radiofrequency signal using a wireless transmission protocol according to the Wi-Fi Alliance.

In Example 13, the computing device of any one of Examples 1 to 12, wherein the computing device is configured to receive the first radiofrequency signal using a wireless transmission protocol according to a wireless Bluetooth connection.

In Example 14, the computing device of any one of Examples 1 to 13, further including an artificial neural network, configured to select either the first wireless communication device or the second wireless communication device as the repeater device based on the first data, the second data, and the one or more repeater selection criteria.

In Example 15, a communication device network including a plurality of wireless communication devices, each wirelessly connected to a common network AP; wherein each of the plurality of wireless communication devices are configured to send a wireless transmission including a primary device selection factor; wherein each of the plurality of wireless communication devices are configured to select a primary wireless communication device based on the primary device selection factor;

wherein the primary device is configured to: receive first data corresponding to a first radiofrequency signal received from a first wireless communication device, and second data corresponding to a second radiofrequency signal received from a second wireless communication device; select either the first wireless communication device or the second wireless communication device as a repeater device based on the first data or the second data according to one or more repeater selection criteria; control a transceiver to send a third radiofrequency signal to the repeater device, wherein the third radiofrequency signal includes third data and an instruction for the repeater device to repeat the third data to the third wireless communication device.

In Example 16, a non-transitory computer readable medium, including instructions which, when executed by one or more processors, cause the one or more processors to: receive first data corresponding to a first radiofrequency signal received from a first wireless communication device, and second data corresponding to a second radiofrequency signal received from a second wireless communication device; select either the first wireless communication device or the second wireless communication device as a repeater device based on the first data or the second data according to one or more repeater selection criteria; instruct a transceiver to send a third radiofrequency signal to the repeater device, wherein the third radiofrequency signal includes third data and an instruction for the repeater device to repeat the third data to the third wireless communication device.

In Example 17, the non-transitory computer readable medium of Example 16, wherein the first data include information about a transmission between the first wireless communication device and a third wireless communication device, or wherein the second data include information about a transmission between the second wireless communication device and a third wireless communication device.

In Example 18, the non-transitory computer readable medium of Example 16 or 17, wherein the first data include a signal strength between the first device and a wireless AP, and wherein the repeater selection criteria include selection of the repeater device based on the signal strength.

In Example 19, the non-transitory computer readable medium of any one of Examples 16 to 18, wherein the second data include a signal strength between the second device and the wireless AP, and wherein the repeater selection criteria include selection of the repeater device based on the signal strength.

In Example 20, the non-transitory computer readable medium of any one of Examples 16 to 19, wherein the first data include an indicator of a number of packet drops between the first device and the wireless AP, and wherein the repeater selection criteria include selection of the repeater device based on the number of packet drops.

In Example 21, the non-transitory computer readable medium of any one of Examples 16 to 20, wherein the second data include an indicator of a number of packet drops between the second device and the wireless AP, and wherein the repeater selection criteria include selection of the repeater device based on the number of packet drops.

In Example 22, the non-transitory computer readable medium of any one of Examples 16 to 21, wherein the first data include an indicator of a number of retransmission errors between the first device and the wireless AP, and wherein the repeater selection criteria include selection of the repeater device based on the number of retransmission errors.

In Example 23, the non-transitory computer readable medium of any one of Examples 16 to 22, wherein the second data include an indicator of a number of retransmission errors between the second device and the wireless AP; and wherein the repeater selection criteria include selection of the repeater device based on the number of retransmission errors.

In Example 24, the non-transitory computer readable medium of any one of Examples 16 to 23, wherein the first data include device context information, wherein the device context information includes any of a battery status of the first device, a current network availability for a network to which the first device is connected, whether the first device is connected to a mains power network; whether the first device is stationary or in motion; or an activity in which the first device is engaged; and wherein the repeater selection criteria include any of a battery status of the first device, a current network availability for a network to which the first device is connected, whether the first device is connected to a mains power network; whether the first device is stationary or in motion.

In Example 25, the non-transitory computer readable medium of any one of Examples 16 to 24, wherein the second data include device context information, wherein the device context information includes any of a battery status of the second device, a current network availability for a network to which the second device is connected, whether the second device is connected to a mains power network; whether the second device is stationary or in motion; or an activity in which the second device is engaged; and wherein the repeater selection criteria include any of a battery status of the first device, a current network availability for a network to which the first device is connected, whether the first device is connected to a mains power network; whether the first device is stationary or in motion.

In Example 26, the non-transitory computer readable medium of any one of Examples 16 to 25, wherein the first data or the second data include an indicator of network bandwidth variation.

In Example 27, the non-transitory computer readable medium of any one of Examples 16 to 26, further including an artificial neural network, wherein the instructions are further configured to cause the one or more processors to select either the first wireless communication device or the second wireless communication device as the repeater device based on the first data, the second data, and the one or more repeater selection criteria using the artificial neural network.

In Example 28, a communication device network including:

a plurality of wireless communication devices, each wirelessly connected to a common network AP; wherein each of the plurality of wireless communication devices each include a non-transitory computer readable medium, including instructions which, when executed by one or more processors, cause the one or more processors to: send a wireless transmission including a primary device selection factor; wherein each of the plurality of wireless communication devices include a non-transitory computer readable medium, including instructions which, when executed by one or more processors, cause the one or more processors to select a primary wireless communication device based on the primary device selection factor; wherein the instructions for the primary device are configured to cause the one or more processors of the primary device to: receive first data corresponding to a first radiofrequency signal received from a first wireless communication device, and second data corresponding to a second radiofrequency signal received from a second wireless communication device; select either the first wireless communication device or the second wireless communication device as a repeater device based on the first data or the second data according to one or more repeater selection criteria; control a transceiver to send a third radiofrequency signal to the repeater device, wherein the third radiofrequency signal includes third data and an instruction for the repeater device to repeat the third data to the third wireless communication device.

In Example 29, a method including receiving first data corresponding to a first radiofrequency signal received from a first wireless communication device, and second data corresponding to a second radiofrequency signal received from a second wireless communication device; selecting either the first wireless communication device or the second wireless communication device as a repeater device based on the first data or the second data according to one or more repeater selection criteria; and instructing a transceiver to send a third radiofrequency signal to the repeater device, wherein the third radiofrequency signal includes third data and an instruction for the repeater device to repeat the third data to the third wireless communication device.

In Example 30, the method of Example 29, wherein the first data include information about a transmission between the first wireless communication device and a third wireless communication device, or wherein the second data include information about a transmission between the second wireless communication device and a third wireless communication device.

In Example 31, the method of Example 29 or 30, wherein the first data include a signal strength between the first device and a wireless AP, and wherein the repeater selection criteria include selection of the repeater device based on the signal strength.

In Example 32, the method of any one of Examples 29 to 31, wherein the second data include a signal strength between the second device and the wireless AP, and wherein the repeater selection criteria include selection of the repeater device based on the signal strength.

In Example 33, the method of any one of Examples 29 to 32, wherein the first data include an indicator of a number of packet drops between the first device and the wireless AP, and wherein the repeater selection criteria include selection of the repeater device based on the number of packet drops.

In Example 34, the method of any one of Examples 29 to 33, wherein the second data include an indicator of a number of packet drops between the second device and the wireless AP, and wherein the repeater selection criteria include selection of the repeater device based on the number of packet drops.

In Example 35, the method of any one of Examples 29 to 34, wherein the first data include an indicator of a number of retransmission errors between the first device and the wireless AP, and wherein the repeater selection criteria include selection of the repeater device based on the number of retransmission errors.

In Example 36, the method of any one of Examples 29 to 35, wherein the second data include an indicator of a number of retransmission errors between the second device and the wireless AP, and wherein the repeater selection criteria include selection of the repeater device based on the number of retransmission errors.

In Example 37, the method of any one of Examples 29 to 36, wherein the first data include device context information, wherein the device context information includes any of a battery status of the first device, a current network availability for a network to which the first device is connected, whether the first device is connected to a mains power network; whether the first device is stationary or in motion; or an activity in which the first device is engaged; and wherein the repeater selection criteria include any of a battery status of the first device, a current network availability for a network to which the first device is connected, whether the first device is connected to a mains power network; whether the first device is stationary or in motion.

In Example 38, the method of any one of Examples 29 to 37, wherein the second data include device context information, wherein the device context information includes any of a battery status of the second device, a current network availability for a network to which the second device is connected, whether the second device is connected to a mains power network; whether the second device is stationary or in motion; or an activity in which the second device is engaged; and wherein the repeater selection criteria include any of a battery status of the first device, a current network availability for a network to which the first device is connected, whether the first device is connected to a mains power network; whether the first device is stationary or in motion.

In Example 39, the method of any one of Examples 29 to 38, wherein the first data or the second data include an indicator of network bandwidth variation.

In Example 40, the method of any one of Examples 29 to 39, further including receiving the first radiofrequency signal using a wireless transmission protocol according to the Wi-Fi Alliance.

In Example 41, the method of any one of Examples 29 to 40, further including receiving the first radiofrequency signal using a wireless transmission protocol according to a wireless Bluetooth connection.

In Example 42, the method of any one of Examples 29 to 41, further including selecting either the first wireless communication device or the second wireless communication device as the repeater device based on the first data, the second data, and the one or more repeater selection criteria using an artificial neural network.

In Example 43, a primary computing device, including one or more processors, configured to: receive a workload report and a power report from each of a plurality of secondary computing devices, wherein each workload report includes identifiers of applications running on a respective secondary computing device of the plurality of respective computing devices; generate an optimized workload for the plurality of secondary computing devices based on the workload reports and the power reports; and instruct a transceiver to send a radiofrequency signal including the optimized workload.

In Example 44, the primary computing device of Example 43, wherein generating the optimized workload includes assigning an application currently executed by a first secondary computing device to a second secondary computing device.

In Example 45, the primary computing device of Examples 43 or 44, wherein determining the optimized workload for the plurality of secondary computing devices includes grouping the applications executed by the secondary computing devices by class and assigning a class of applications to a secondary computing device of the one or more secondary computing devices.

In Example 46, the primary computing device of any one of Examples 43 to 45, wherein the power report includes a power resource value; wherein the power resource value indicates whether a secondary computing device of the plurality of secondary computing devices is connected to a mains power supply and/or wherein the power resource value indicates a battery power available to the secondary computing device; and wherein determining the optimized workload for the plurality of secondary computing devices further includes assigning a class of applications based on the power resource value.

In Example 47, the primary computing device of any one of Examples 43 to 46, wherein the power report includes a power demand of one or more applications performed by a corresponding secondary computing device, and wherein generating the optimized workload includes generating the optimized workload based on the power demand by the one or more applications.

In Example 48, the primary computing device of any one of Examples 43 to 47, wherein the workload report further includes a user interaction value, representing user interaction with the applications being executed by the respective secondary computing device of the plurality of computing devices, and wherein determining the optimized workload for the plurality of secondary computing devices further includes ranking applications within a class based on the user interaction value.

In Example 49, the primary computing device of any one of Examples 43 to 48, wherein the primary device is configured to receive the workload report and the power report, and to send the optimization report, using a peer-to-peer wireless network connection.

In Example 50, the primary computing device of any one of Examples 43 to 49, wherein the one or more processors are further configured to send an instruction for each of the secondary computing devices to send the workload report and the power report.

In Example 51, the primary computing device of any one of Examples 43 to 50, wherein the primary computing device further includes an artificial neural network, configured to generate the optimized workload based on the workload report and the power report, and wherein the one or more processors generating the optimized workload includes generating the optimized workload using the artificial neural network.

In Example 52, the primary computing device of Example 51, wherein the artificial neural network is further configured to receive a power efficiency indicator from each of the secondary computing devices; wherein generating the optimized workload further includes generating the optimized workload based on the power efficiency indicators.

In Example 53, the primary computing device of any one of Examples 43 to 52, wherein the primary computing device is configured as a hub device, and wherein the primary computing device is configured to connect to the plurality of secondary computing devices as a plurality of spoke devices.

In Example 54, a secondary computing device, including:

one or more processors, configured to send a workload report and a power report to a primary computing device, wherein the workload report includes identifiers of applications running on the secondary computing device; receive an optimized workload from the primary computing device; and assume execution of an application from another secondary computing device based on the optimized workload or discontinue executing an application to be assumed by another secondary computing device based on the optimized workload.

In Example 54a, the secondary computing device of Example 54, in which an efficiency of the secondary computing device is increased with the optimized workload.

In Example 54b, the secondary computing device of Example 54 or 54a, in which a power efficiency of the secondary computing device is increased with the optimized workload.

Example 54c, Example 54a, the secondary computing device of any one of Examples 54 to 54b, in which the secondary computing device is in a group of a plurality of secondary working devices, and in which an overall efficiency of the secondary computing devices is increased with the optimized workload.

In Example 55, a non-transitory computer readable medium, including instructions which, if executed, cause one or more processors to receive a workload report and a power report from each of a plurality of secondary computing devices, wherein each workload report includes identifiers of applications running on a respective secondary computing device of the plurality of respective computing devices; generate an optimized workload for the plurality of secondary computing devices based on the workload reports and the power reports; and instruct a transceiver to send a radiofrequency signal including the optimized workload.

In Example 56, the non-transitory computer readable medium of Example 55, wherein generating the optimized workload includes assigning an application currently executed by a first secondary computing device to a second secondary computing device.

In Example 57, the non-transitory computer readable medium of Examples 55 or 56, wherein determining the optimized workload for the plurality of secondary computing devices includes grouping the applications executed by the secondary computing devices by class and assigning a class of applications to a secondary computing device of the one or more secondary computing devices.

In Example 58, the non-transitory computer readable medium of any one of Examples 55 to 57, wherein the power report includes a power resource value; wherein the power resource value indicates whether a secondary computing device of the plurality of secondary computing devices is connected to a mains power supply and/or wherein the power resource value indicates a battery power available to the secondary computing device; and wherein determining the optimized workload for the plurality of secondary computing devices further includes assigning a class of applications based on the power resource value.

In Example 59, the non-transitory computer readable medium of any one of Examples 55 to 58, wherein the power report includes a power demand of one or more applications performed by a corresponding secondary computing device, and wherein generating the optimized workload includes generating the optimized workload based on the power demand by the one or more applications.

In Example 60, the non-transitory computer readable medium device of any one of Examples 55 to 59, wherein the workload report further includes a user interaction value, representing user interaction with the applications being executed by the respective secondary computing device of the plurality of computing devices, and wherein determining the optimized workload for the plurality of secondary computing devices further includes ranking applications within a class based on the user interaction value.

In Example 61, the non-transitory computer readable medium of any one of Examples 55 to 60, wherein the primary device is configured to receive the workload report and the power report, and to send the optimization report, using a peer-to-peer wireless network connection.

In Example 62, the non-transitory computer readable medium of any one of Examples 55 to 61, wherein the instructions are further configured to cause the one or more processors to send an instruction for each of the secondary computing devices to send the workload report and the power report.

In Example 63, the non-transitory computer readable medium of any one of Examples 55 to 62, wherein the instructions are further configured to cause the one or more processors to generate the optimized workload based on the workload report and the power report using an artificial neural network.

In Example 64, the non-transitory computer readable medium of Example 63, wherein the instructions are further configured to cause the one or more processors to receive a power efficiency indicator from each of the secondary computing devices and to generate the optimized workload based on the power efficiency indicators using the artificial neural network.

In Example 65, a non-transitory computer readable medium, including instructions which, if executed, cause one or more processors to send a workload report and a power report to a primary computing device, wherein the workload report includes identifiers of applications running on the secondary computing device; receive an optimized workload from the primary computing device; and assume execution of an application from another secondary computing device based on the optimized workload or discontinue executing an application to be assumed by another secondary computing device based on the optimized workload.

In Example 66, a method, including receive a workload report and a power report from each of a plurality of secondary computing devices, wherein each workload report includes identifiers of applications running on a respective secondary computing device of the plurality of respective computing devices; generate an optimized workload for the plurality of secondary computing devices based on the workload reports and the power reports; and instruct a transceiver to send a radiofrequency signal including the optimized workload.

In Example 67, the method of Example 66, wherein generating the optimized workload includes assigning an application currently executed by a first secondary computing device to a second secondary computing device.

In Example 68, the method of Examples 66 or 67, wherein determining the optimized workload for the plurality of secondary computing devices includes grouping the applications executed by the secondary computing devices by class and assigning a class of applications to a secondary computing device of the one or more secondary computing devices.

In Example 69, the method of any one of Examples 66 to 68, wherein the power report includes a power resource value; wherein the power resource value indicates whether a secondary computing device of the plurality of secondary computing devices is connected to a mains power supply and/or wherein the power resource value indicates a battery power available to the secondary computing device; and wherein determining the optimized workload for the plurality of secondary computing devices further includes assigning a class of applications based on the power resource value.

In Example 70, the method of any one of Examples 66 to 69, wherein the power report includes a power demand of one or more applications performed by a corresponding secondary computing device, and wherein generating the optimized workload includes generating the optimized workload based on the power demand by the one or more applications.

In Example 71, the method device of any one of Examples 66 to 70, wherein the workload report further includes a user interaction value, representing user interaction with the applications being executed by the respective secondary computing device of the plurality of computing devices, and wherein determining the optimized workload for the plurality of secondary computing devices further includes ranking applications within a class based on the user interaction value.

In Example 72, the method of any one of Examples 66 to 71, wherein the primary device is configured to receive the workload report and the power report, and to send the optimization report, using a peer-to-peer wireless network connection.

In Example 73, the method of any one of Examples 66 to 72, further including causing the one or more processors to send an instruction for each of the secondary computing devices to send the workload report and the power report.

In Example 74, the method of any one of Examples 66 to 73, further including causing the one or more processors to generate the optimized workload based on the workload report and the power report using an artificial neural network.

In Example 75, the method of Example 74, further including causing the one or more processors to receive a power efficiency indicator from each of the secondary computing devices and to generate the optimized workload based on the power efficiency indicators using the artificial neural network.

In Example 76, a method, including instructions which, if executed, cause one or more processors to send a workload report and a power report to a primary computing device, wherein the workload report includes identifiers of applications running on the secondary computing device; receive an optimized workload from the primary computing device; and assume execution of an application from another secondary computing device based on the optimized workload or discontinue executing an application to be assumed by another secondary computing device based on the optimized workload.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A primary computing device, comprising:

one or more processors, configured to:

receive a workload report and a power report from each of a plurality of secondary computing devices;

wherein each workload report includes identifiers of applications running on a respective secondary computing device of the plurality of respective computing devices;

generate an optimized workload for the plurality of secondary computing devices based on the workload reports and the power reports;

instruct a transceiver to send a radiofrequency signal including the optimized workload; and wherein generating the optimized workload includes assigning an application currently executed by a first secondary computing device to a second secondary computing device.

2. The primary computing device of claim 1, wherein the power report comprises a power resource value; wherein the power resource value indicates whether a secondary computing device of the plurality of secondary computing devices is connected to a mains power supply; and wherein generating the optimized workload for the plurality of secondary computing devices further includes assigning a class of applications based on the power resource value.

3. The primary computing device of claim 1, wherein generating the optimized workload for the plurality of secondary computing devices comprises grouping the applications executed by the secondary computing devices by class and assigning a class of applications to a secondary computing device of the one or more secondary computing devices.

4. The primary computing device of claim 1, wherein the power report includes a power demand of one or more applications performed by a corresponding secondary computing device, and wherein generating the optimized workload includes generating the optimized workload based on the power demand by the one or more applications.

5. The primary computing device of claim 1, wherein the workload report further comprises a user interaction value, representing user interaction with the applications being executed by the respective secondary computing device of the plurality of computing devices, and wherein generating the optimized workload for the plurality of secondary computing devices further comprises ranking applications within a class based on the user interaction value.

6. The primary computing device of claim 1, wherein the primary computing device is configured to receive the workload report and the power report, and to send an optimization report, using a peer-to-peer wireless network connection.

7. The primary computing device of claim 1, wherein the one or more processors are further configured to send an instruction for each of the secondary computing devices to send the workload report and the power report.

8. The primary computing device of claim 1, wherein the primary computing device further comprises an artificial neural network, configured to generate the optimized workload based on the workload report and the power report, and wherein the one or more processors generating the optimized workload comprises generating the optimized workload using the artificial neural network.

9. The primary computing device of claim 8, wherein the artificial neural network is further configured to receive a power efficiency indicator from each of the secondary computing devices; wherein generating the optimized workload further includes generating the optimized workload based on the power efficiency indicators.

10. The primary computing device of claim 1, wherein the primary computing device is configured as a hub device, and wherein the primary computing device is configured to connect to the plurality of secondary computing devices as a plurality of spoke devices.

11. A non-transitory computer readable medium, comprising instructions which, when executed, cause one or more processors to receive a workload report and a power report from each of a plurality of secondary computing devices, wherein each workload report comprises identifiers of applications running on a respective secondary computing device of the plurality of respective computing devices; generate an optimized workload for the plurality of secondary computing devices based on the workload reports and the power reports; and instruct a transceiver to send a radiofrequency signal including the optimized workload;

wherein generating the optimized workload includes assigning an application currently executed by a first secondary computing device to a second secondary computing device.

12. The non-transitory computer readable medium of claim 11, wherein generating the optimized workload for the plurality of secondary computing devices includes grouping the applications executed by the secondary computing devices by class and assigning a class of applications to a secondary computing device of the one or more secondary computing devices.

13. The non-transitory computer readable medium of claim 11, wherein the power report includes a power resource value;

wherein the power resource value indicates whether a secondary computing device of the plurality of secondary computing devices is connected to a mains power supply; and wherein generating the optimized workload for the plurality of secondary computing devices further includes assigning a class of applications based on the power resource value.

14. The non-transitory computer readable medium of claim 11, wherein the power report includes a power demand of one or more applications performed by a corresponding secondary computing device, and wherein generating the optimized workload includes generating the optimized workload based on the power demand by the one or more applications.

15. The non-transitory computer readable medium of claim 11, wherein the workload report further includes a user interaction value, representing user interaction with the applications being executed by the respective secondary computing device of the plurality of computing devices, and wherein generating the optimized workload for the plurality of secondary computing devices further includes ranking applications within a class based on the user interaction value.

16. The non-transitory computer readable medium of claim 11, wherein the instructions are further configured to cause the one or more processors to receive the workload report and the power report, and to send an optimization report, using a peer-to-peer wireless network connection.

17. The non-transitory computer readable medium of claim 11, wherein the instructions are further configured to cause the one or more processors to send an instruction for each of the secondary computing devices to send the workload report and the power report.

18. The non-transitory computer readable medium of claim 11, wherein the instructions are further configured to cause the one or more processors to generate the optimized workload based on the workload report and the power report using an artificial neural network.

19. The non-transitory computer readable medium of claim 18, wherein the instructions are further configured to cause the one or more processors to receive a power efficiency indicator from each of the secondary computing devices and to generate the optimized workload based on the power efficiency indicators using the artificial neural network.

* * * * *